US011593178B2

(12) United States Patent
Khosrowpour et al.

(10) Patent No.: US 11,593,178 B2
(45) Date of Patent: Feb. 28, 2023

(54) ML-TO-ML ORCHESTRATION SYSTEM AND METHOD FOR SYSTEM WIDE INFORMATION HANDLING SYSTEM (IHS) OPTIMIZATION

(71) Applicant: Dell Products, L.P., Round Rock, TX (US)

(72) Inventors: Farzad Khosrowpour, Pflugerville, TX (US); Mitchell Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 158 days.

(21) Appl. No.: 17/148,291

(22) Filed: Jan. 13, 2021

(65) Prior Publication Data

US 2022/0222126 A1    Jul. 14, 2022

(51) Int. Cl.
*G06F 9/50* (2006.01)
*G06F 21/31* (2013.01)
*G06N 20/20* (2019.01)

(52) U.S. Cl.
CPC .......... *G06F 9/5072* (2013.01); *G06F 9/5011* (2013.01); *G06F 21/31* (2013.01); *G06N 20/20* (2019.01)

(58) Field of Classification Search
CPC ...... G06F 9/5072; G06F 9/5011; G06F 21/31; G06N 20/20
See application file for complete search history.

(56) References Cited

U.S. PATENT DOCUMENTS

| 10,810,502 | B2 * | 10/2020 | Pillai | G06N 5/04 |
| 11,397,658 | B1 * | 7/2022 | Pang | G06F 9/45558 |
| 2020/0104184 | A1 * | 4/2020 | Subramanian | G06N 3/08 |
| 2020/0195495 | A1 * | 6/2020 | Parker | H04L 41/082 |
| 2020/0389375 | A1 * | 12/2020 | Haze | G06F 9/505 |
| 2022/0103614 | A1 * | 3/2022 | Ganguli | H04L 67/10 |

\* cited by examiner

*Primary Examiner* — Jorge A Chu Joy-Davila
(74) *Attorney, Agent, or Firm* — Fogarty LLP

(57) ABSTRACT

Embodiments of systems and methods for managing performance optimization of applications executed by an Information Handling System (IHS) are described. In an illustrative, non-limiting embodiment, an IHS may include computer-executable instructions to, for each of multiple resources used to execute a target application, receive one or more machine learning (ML)-based hints associated with each resource that have been generated by a ML-based optimization service, and generate one or more augmented hints for at least one of the resources using a ML-to-ML orchestration service. The ML-to-ML orchestration service then transmits the augmented hints to the ML-based optimization service that combines the augmented ML-based hints with the one or more internally generated hints to generate augmented profile recommendations that are, in turn, used to adjust one or more settings of the resource to optimize a performance of the target application executed by the resource.

20 Claims, 6 Drawing Sheets

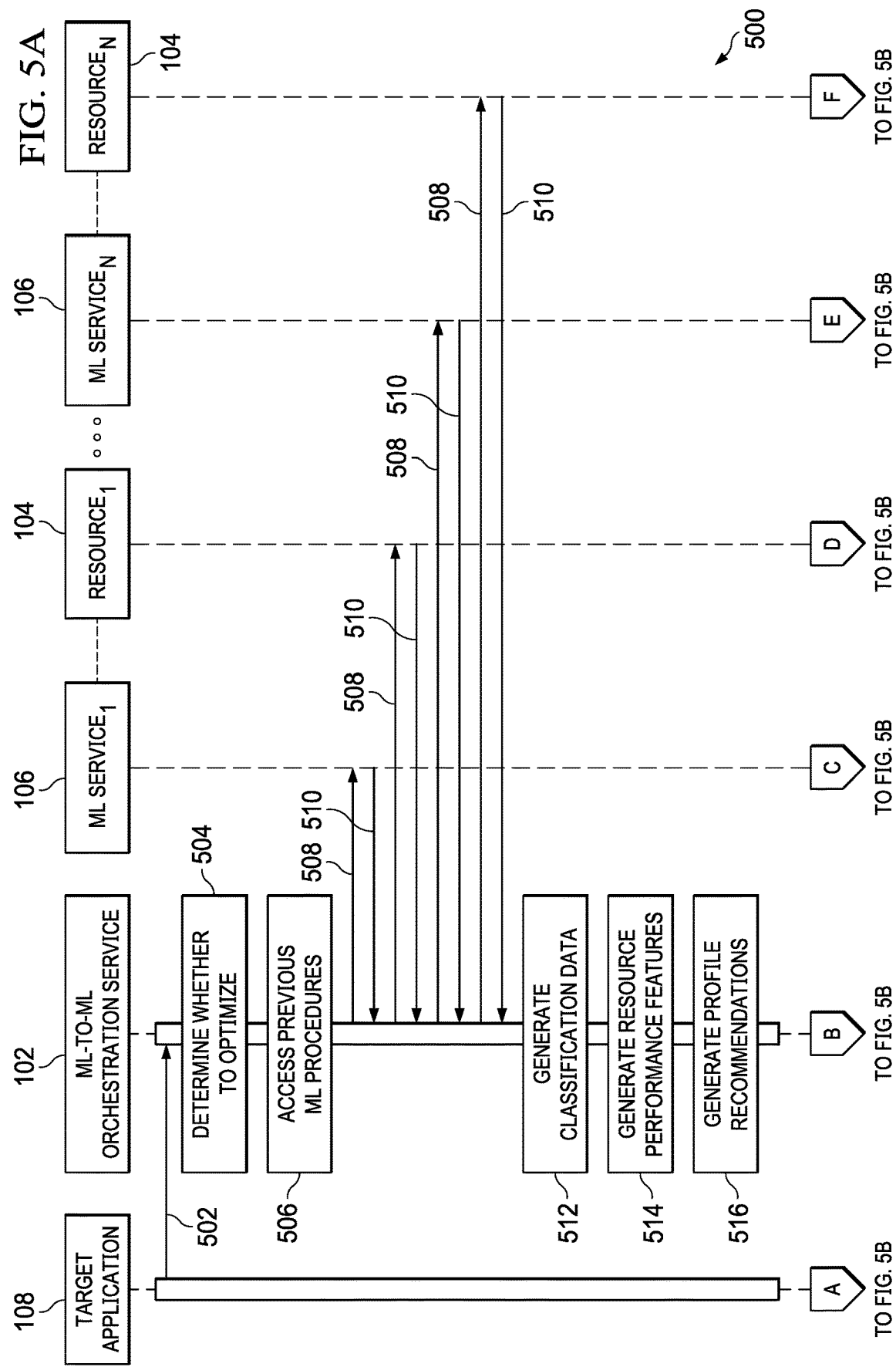

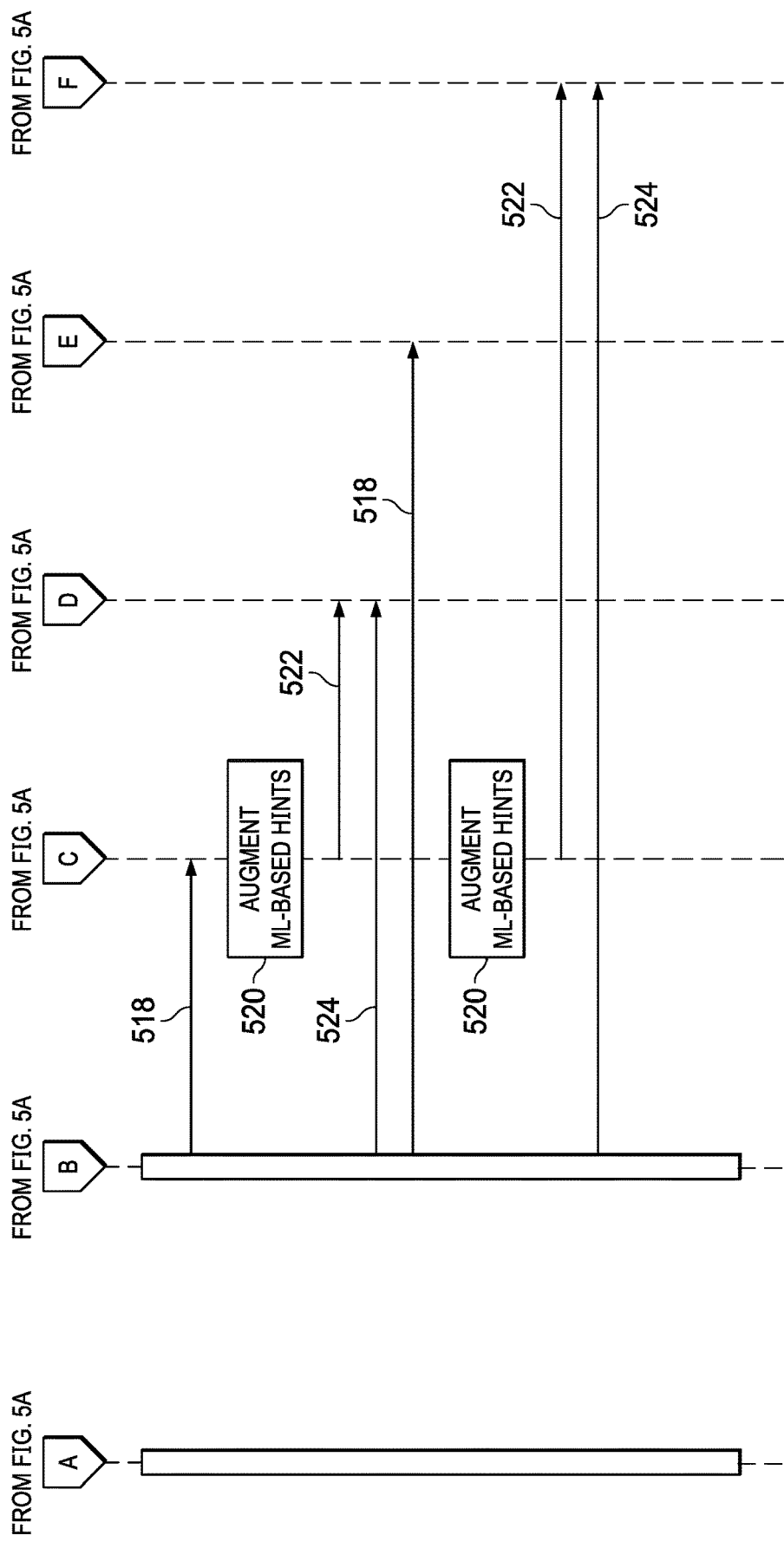

ML-TO-ML ORCHESTRATION SYSTEM AND METHOD FOR SYSTEM WIDE INFORMATION HANDLING SYSTEM (IHS) OPTIMIZATION

FIELD

The present disclosure relates generally to Information Handling Systems (IHSs), and more particularly, to a ML-to-ML orchestration system and method for system wide information handling system (IHS) optimization.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can execute many different types of applications. In some IHSs, a machine learning (ML) engine (e.g., optimization engine) may be used to improve application performance by dynamically adjusting IHS settings. Particularly, a ML engine may apply a profile to adjust the operation of certain resources of the IHS, such as the operating system (OS), hardware resources (e.g., central processing units (CPU), graphics processing units (GPU), storage, etc.), or drivers used to interface with those hardware resources, or other applications that may be executed by the IHS.

Many IHS designs are currently implemented with numerous resources that are each provided with ML-based optimization services to enhance their performance. But because these ML-based optimization services function individually without regard for each others operation, overall optimization of the IHS is often limited due in large part to the inability of these ML-based optimization services to coordinate their operations with one another. It is with these problems, among others, in mind that embodiments of the present disclosure have been developed.

SUMMARY

Embodiments of systems and methods for managing performance optimization of applications executed by an Information Handling System (IHS) are herein described. In an illustrative, non-limiting embodiment, an IHS may include computer-executable instructions, for each of multiple resources used to execute a target application, receive one or more machine learning (ML)-based hints associated with each resource that have been generated by a ML-based optimization service, and generate one or more augmented hints for at least one of the resources using a ML-to-ML orchestration service. The ML-to-ML orchestration service then transmits the augmented hints to the ML-based optimization service that combines the augmented ML-based hints with the one or more internally generated hints to generate augmented profile recommendations that are, in turn, used to adjust one or more settings of the resource to optimize a performance of the target application executed by the resource.

According to another embodiment, an IHS orchestration method includes the steps of receiving, for each of multiple resources used to execute a target application, one or more machine learning (ML)-based hints associated with each resource, and generating one or more augmented ML-based hints for at least one of the resources according to the received ML-based hints associated with each of the resources. The steps further include the steps of combining the augmented ML-based hints with the one or more internally generated hints to generate augmented profile recommendations that are, in turn, used to adjust one or more settings of the resources to optimize a performance of the target application executed by the resources.

According to yet another embodiment, a memory storage device has program instructions stored thereon that, upon execution by one or more processors of an Information Handling System (IHS), cause the IHS to, for each of multiple resources used to execute a target application, receive one or more machine learning (ML)-based hints associated with each resource that have been generated by a ML-based optimization service, and generate one or more augmented hints for at least one of the resources using a ML-to-ML orchestration service. The ML-to-ML orchestration service then transmits the augmented hints to the ML-based optimization service that combines the augmented ML-based hints with the one or more internally generated hints to generate augmented profile recommendations that are, in turn, used to adjust one or more settings of the resource to optimize a performance of the target application executed by the resource.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 5A and 5B illustrate a workflow diagram of an example application optimization method that may be performed by the various elements of the IHS for performing a ML-based learning procedure according to one embodiment of the present disclosure.

DETAILED DESCRIPTION

Embodiments of the present disclosure provide a machine learning-to-machine learning (ML-to-ML) orchestration system and method for system wide information handling system (IHS) optimization, which coordinates the operation of multiple ML-based optimization engines in an IHS. Whereas conventional IHS implementations typically employ the use of multiple ML-based optimization services, these ML-based optimization services operate independently of one another such that overall optimization of the IHS is often constrained due in large part to conflicting resource adjustments that often occur. Embodiments of the present disclosure provide a solution to this problem, among other problems, by providing a ML-to-ML orchestration system that coordinates the operation of some, most, or all ML-based optimization systems of the IHS so that system wide optimization can be attained.

Figure 1:
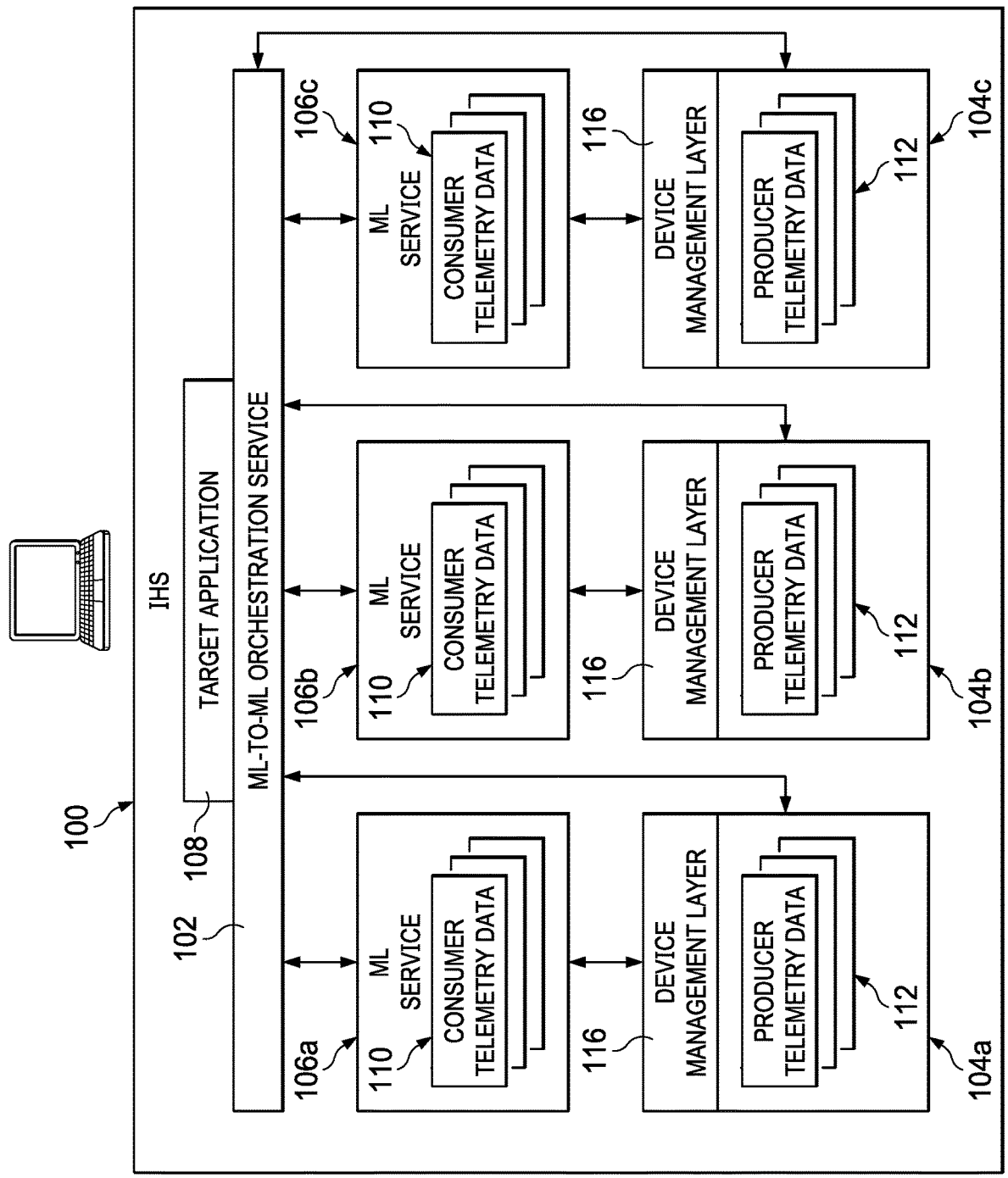
FIG. 1 illustrates an example information handling system (IHS) that may be implemented with a ML-to-ML orchestration service according to one embodiment of the present disclosure.

FIG. 1 illustrates an example information handling system (IHS) 100 that may be implemented with a ML-to-ML orchestration service 102 according to one embodiment of the present disclosure. As shown, IHS 100 includes hardware resources 104a (e.g., CPU, GPU, storage, etc.), software resources 104b (e.g., operating system (OS), other applications executed on IHS, drivers, etc.), and various platform resources 104c (e.g., communication systems, peripheral devices, power/thermal control systems, etc.) that may be used to execute a target application 108 on IHS 100. Each of these hardware resources 104a, software resource 104b, and platform resources 104c may be at least partially controlled by a ML-based optimization service 106a, 106b, and 106c, respectively. As will be described in detail herein below, a ML-to-ML orchestration service 102 communicates with some, most, or all ML-based optimization services 106 to provide system wide optimization for IHS 100 by coordinating the operation of each ML-based optimization service 106.

Within this disclosure, the term resources may be collectively used to describe the hardware resources 104a, software resources 104b, and platform resources 104c of IHS 100. Although a ML-based optimization service 106 is shown for each hardware resource 104a, software resource 104b, and platform resource 104c, it should be understood that other ML-based optimization engines may be implemented on IHS 100 that is configured to optimize a group or a subset of resources 104 implemented in IHS 100. It should also be understood that some resources 104 may not be controlled in any significant manner by an ML-based optimization service. In such cases, ML-to-ML orchestration service 102 may be configured to directly receive telemetry data (e.g., producer telemetry data) from those resources, and generate profile recommendations that may be used to control or adjust those resources.

Each resource 104 may generate producer telemetry data 112 that may be used by its corresponding ML-based optimization service 106 to optimize its operation. The ML-based optimization service 106 of each resource 104 may use certain consumer telemetry data 110 to optimize its associated resource 104. Producer telemetry data 112 generally refers to telemetry data that is produced by the resource and available for use by other ML-based optimization service 106 in IHS 100. Consumer telemetry data 110, on the other hand, refers to telemetry data that may be used by a ML-based optimization service 106 for optimization of its associated resource 104, yet may be generated by any resource 104 in IHS 100. For example, a CPU hardware resource 104a may generate producer telemetry data 112, such as performance level settings, power usage settings, system boot settings, media settings, and display settings, while its corresponding ML-based optimization service 106 may use power level settings (PLX), and/or machine learning dynamic thermal power (MLDTP) that are obtained from system BIOS. As another example, a storage hardware resource 104a may generate producer telemetry data 112, such as performance level settings, or certain INTEL's RAPID STORAGE TECHNOLOGY (RST) settings, while its corresponding ML-based optimization service 106 may use windows class library (WL) settings from the operating system, or other RST settings that are obtained from other resources in IHS 100.

While in some cases each resource 104 may expose certain producer telemetry data for use by ML-based optimization service 106 of other resources, in other cases certain portions of the producer telemetry data generated by a resource is not necessarily made available to the other resources 104 in IHS 100. ML-based hints generally refer to output parameters of a ML-based optimization service, such as profile recommendations, resource performance features, classification information, raw telemetry data, and the like. Furthermore, each ML-based optimization service 106 may generate ML-based hints that can be used to optimize the performance level of its associated resource, those ML-based hints have not been heretofore been made available to the other ML-based optimization service 106. As a result, certain optimization actions taken by one ML-based optimization service 106 may experience contention with another ML-based optimization service 106 attempting to optimize its resource 104 in a different manner.

Embodiments of the present disclosure provide a solution to this problem, among other problems, using ML-to-ML orchestration service 102, which communicates with ML-based optimization services 106 configured in IHS 100 to coordinate their operation for optimizing performance of target application 108 executed on IHS 100. Coordination is provided by a ML-to-ML hinting technique whereby ML-to-ML orchestration service 102 receives ML-based hints, such as profile recommendations, resource performance features, classification information, raw telemetry data, and the like from individual ML-based optimization services 106, performs a ML process using the received ML-based hints to generate one or more augmented ML-based hints that are transmitted back to certain ML-based optimization services 106 in IHS 100. Using these augmented ML-based hints, those ML-based optimization services 106 may further augment their profile recommendations that are used to adjust their respective resources 104 that they are configured to manage.

In one embodiment, ML-to-ML orchestration service 102 may communicate with certain resources 104 through a device management layer 116 associated with each resource 104. For example, each device management layer 116 may expose an interface, such as an application program interface (API), for transmitting telemetry data associated with the operation of its service 104, and receiving instructions from its respective ML-based optimization service 106 and/or ML-to-ML orchestration service 102 for adjusting certain settings of its resource 104. Providing such an interface scheme allows certain operational parameters of each service to be exposed in a controlled manner for optimizing operation of its respective resource, while restricting access to other parameters that could otherwise cause harm to the resource 104 or unnecessarily hinder its operation.

As shown, ML-to-ML orchestration service 102 may receive ML-based hints in the form of profile recommendations, resource performance features, classification information from participating ML-based orchestration services 106 alone, ML-based hints in the form of telemetry data directly from resources 104, and/or ML-based hints from both services 106 and their resources 104. Certain embodiments that receive ML-based hints directly from resources 104 may be advantageous in that it can provide ML-based hints having a relatively high level of reliability because it receives input directly from the resources 104 that it is configured to manage. On the other hand, certain embodiments of ML-to-ML orchestration service 102 that receive ML-based hints from ML-based optimization services 106 may be advantageous in that it can provide enhanced performance optimization because it receives input in the form of ML-based hints that can be iteratively enhanced for further optimization of performance of the resources 104 in IHS 100. In one embodiment, the configuration of how ML-to-ML orchestration service 102 receives ML-based hints from either or both services 106 and resources 104 may be a configurable parameter that may be set manually due to user input, or automatically by a process running on IHS 100, such as by ML-to-ML orchestration service 102 itself.

Figure 2:
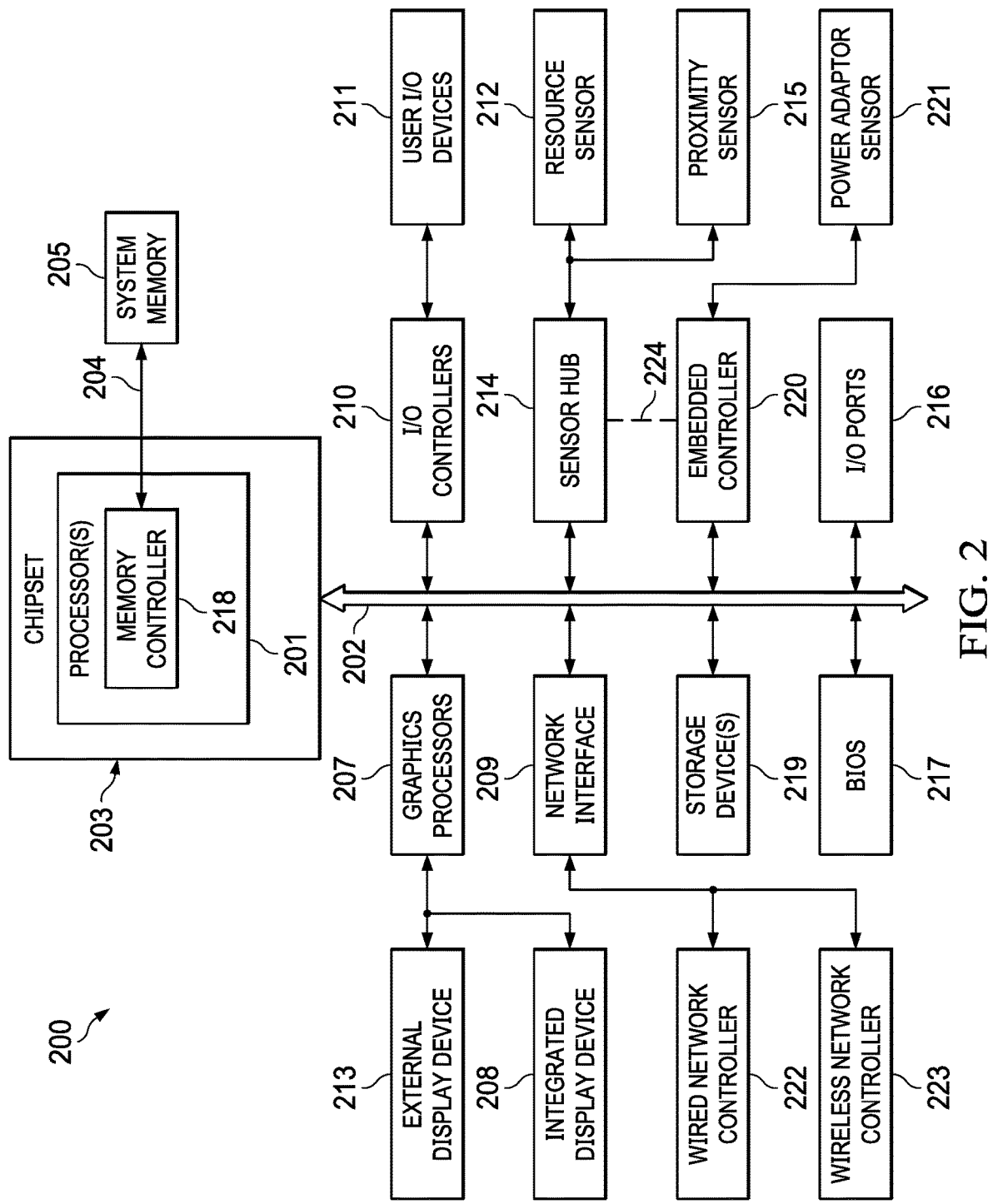
FIG. 2 is a block diagram illustrating components of the IHS configured to manage performance optimization of applications.

FIG. 2 is a block diagram illustrating components of an example IHS 200 that may be configured to manage performance optimization of applications according to one embodiment of the present disclosure. IHS 200 may be incorporated in whole, or part, as IHS 200 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O 216 ports may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 100.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
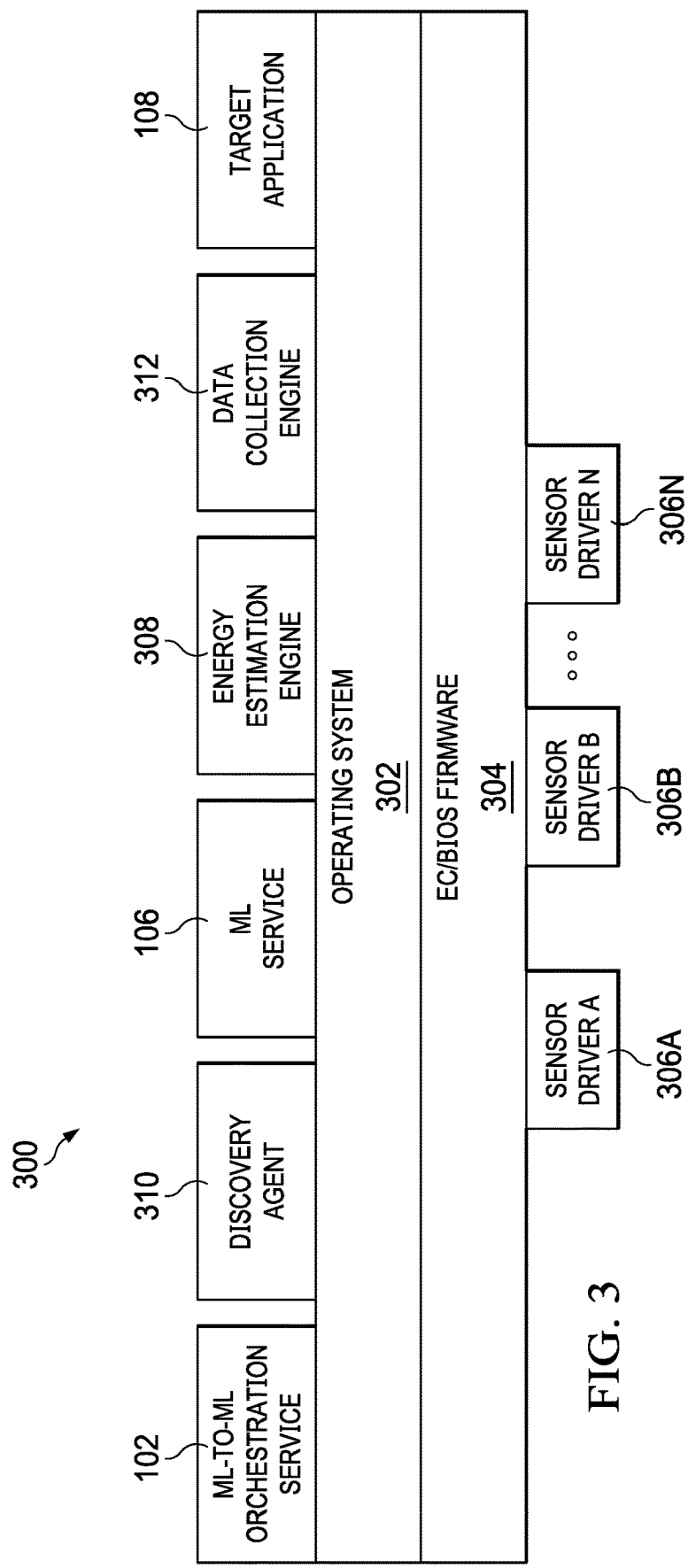
FIG. 3 is a block diagram illustrating an example of a software system produced by the IHS for managing the performance optimization of a target application according to one embodiment of the present disclosure.

FIG. 3 is a block diagram illustrating an example of a software system 300 produced by IHS 100 for managing the performance optimization of a target application 108. In some embodiments, each element of software system 300 may be provided by IHS 100 through the execution of program instructions by one or more logic components (e.g., CPU 201, BIOS 217, EC 220, etc.) stored in memory (e.g., system memory 205), storage device(s) 219, and/or firmware. As shown, software system 300 includes a ML-to-ML orchestration service 102, multiple ML-based optimization services 106, a discovery agent 310, an energy estimation engine 308, a data collection engine 312, and target application 108. Although only one target application 108 is shown herein, it should be understood that ML-to-ML orchestration service 102 may be configured to optimize the performance of any type and number of target applications that may be executed on IHS 100.

In one embodiment, ML-to-ML orchestration service 102 may include features, or form a part of, the DELL PRECISION OPTIMIZER. Examples of a suitable target application 108 whose performance may be optimized includes resource-intensive applications, such as MICROSOFT POWERPOINT, MICROSOFT EXCEL, MICROSOFT WORD, ADOBE ILLUSTRATOR, ADOBE AFTER EFFECTS, ADOBE MEDIA ENCODER, ADOBE PHOTOSHOP, ADOBE PREMIER, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

Both ML-to-ML orchestration service 102 and target application 108 are executed by an OS 302, which is turn supported by EC/BIOS instructions/firmware 304. EC/BIOS firmware 304 is in communications with, and configured to receive data collected by, one or more sensor modules or drivers 306$_A$-306$_N$, which may abstract and/or interface with hardware resource sensor 212, proximity sensor 215, and power adapter sensor 221, for example.

Discovery agent 310 is provided to discover the resources 104 and any ML-based optimization service 106 configured in system, and report the results to ML-to-ML orchestration service 102. For example, discovery agent 310 may respond to a request from ML-to-ML orchestration service 102 to acquire information regarding most or all resources 104 configured in IHS 100 as well as any ML-based optimization service 106 that may have been implemented for optimizing certain resources 104 or a certain subset of resources 104. In a particular example, discovery agent 310 may access a firmware portion of IHS 100 to obtain the resource data for those resources registered in its BIOS 217, and stored in a memory 205 of IHS 100. Within this disclosure, resource data generally refers to any information that may be used to access and/or manage its associated resource (e.g., acquire parametric data, change its configuration, etc.) including any ML-based optimization service 106 present in IHS 100 that may be associated with each resource. For any non-registered (unsupported/unqualified) resource, however, its resource data may be unknown. That is, no data or insufficient data for that resource may be available in BIOS 217. In such a case, ML-to-ML orchestration service 102 may issue or broadcast inquiry messages to those resources in IHS 100, and process response messages to identify those non-registered resources in IHS 100, and report the results back to ML-to-ML orchestration service 102.

In various embodiments, software system 300 also includes an energy estimation engine 308, such as the MICROSOFT E3 engine, which is configured to provide energy usage data broken down by applications, services, tasks, and/or hardware in an IHS. In some cases, energy estimation engine 308 may use software and/or hardware sensors configured to determine, for example, whether target application 108 is being executed in the foreground or in the background (e.g., minimized, hidden, etc.) of the IHS's graphical user interface (GUI).

Data collection engine 312 may include any data collection service or process, such as, for example, the DELL DATA VAULT configured as a part of the DELL SUPPORT CENTER that collects information on system health, performance, and environment. In some cases, data collection engine 312 may receive and maintain a database or table that includes information related to IHS hardware utilization (e.g., by application, by thread, by hardware resource, etc.), power source (e.g., AC-plus-DC, AC-only, or DC-only), and the like.

In general, ML-to-ML orchestration service 102 functions as a higher level inference engine to supervise and/or manage other ML services 106 in an IHS 100 for coordinating optimization among its various resources. Moreover, ML-to-ML orchestration service 102 provides for system wide optimization of application 108 by obtaining data from the various resources that form the IHS 100, and analyzing the obtained data to generate ML-based hints based upon the overall coordinated operation of some, most, or all resources that are used to execute application 108. In one embodiment, ML-to-ML orchestration service 102 includes a policy management function that optimizes the operation of application 108 according to one or more policies. For example, the policy management function may limit hints that would be otherwise applied to certain ML services 106 based upon those hints causing undue loading upon certain other resources in IHS 100. Furthering this example, while ML-to-ML orchestration service 102 would otherwise infer that an increase of memory caching provided by system memory 205 may be beneficial to the operation of application 108, its knowledge about other applications running on IHS 100 as well as the current state of other resources in the IHS 100 may indicate that such inference should be reduced (e.g., throttled) so as to not unduly overburden those other resources. Additionally, ML-to-ML orchestration service 102 may use the policy management function to infer hints for other resources in IHS 100 so that most or all of the resources in IHS 100 may be collectively optimized for operation of the application 108.

ML-to-ML orchestration service 102 monitors each ML-based optimization service 106 along with telemetry data obtained directly from resources 104, and sensors 306 to characterize its resource utilization. For example, ML-to-ML orchestration service 102 may obtain ML-based hints from ML-based optimization service 106 in addition to telemetry data from energy estimation engine 308, data collection engine 312, and/or directly from sensors 306$_1$-306$_N$ configured in IHS 100 to generate one or more ML-based hints associated with target application 108. Once ML-to-ML orchestration service 102 has collected characteristics over a period of time, it may then process the collected data using statistical descriptors to extract the application performance features of target application 108. For example, ML-to-ML orchestration service 102 may monitor target application 108 over time to estimate its resource usage with respect to various aspects, such as which actions performed by target application 108 cause certain resources to encounter loading, events occurring on IHS 100 that causes target application 108 to require a relatively high level of resource usage, and a time period of day in which these actions are encountered. Once ML-to-ML orchestration service 102 has collected characteristics over a period of time, it may then process the collected data using statistical descriptors to extract the application performance features associated with target application 108. Both or either of ML-to-ML orchestration service 102 or ML-based optimization services 106 may use a machine learning algorithm such as, for example, a Bayesian algorithm, a Linear Regression algorithm, a Decision Tree algorithm, a Random Forest algorithm, a Neural Network algorithm, or the like.

According to embodiments of the present disclosure, ML-to-ML orchestration service 102 receives ML-based hints of resources derived by ML-based optimization service 106, and evaluates the performance features of each against a trained ML model to generate augmented ML-based hints. ML-to-ML orchestration service 102 transmits the augmented ML-based hints to participating ML-based optimization services 106 so that they, in turn, can adjust (e.g., adapt) the resources to optimize the performance of target application 108. In one embodiment, ML-to-ML orchestration service 102 combines the ML-based hints from each ML-based optimization service 106 using a ML hinting process. Hinting generally refers to a process of ML whereby features derived by a first ML process may be shared with another ML process to derive additional features above and beyond those features that would otherwise be individually derived. In the present case, ML-to-ML orchestration service 102 combines the ML-based hints from most or all XML-based optimization service 106 in a manner so that additional augmented performance features can be derived. These augmented ML-based hints can then be used to optimize performance of target application 108 on IHS 100.

As shown, ML-to-ML orchestration service 102 is stored and executed on the IHS 100 it is configured to provide optimization services for. In other embodiments, ML-to-ML orchestration service 102 may be a cloud provided service in which it communicates through a publicly available communication network, such as the Internet, to communicate with ML-based optimization services 106 and their associated resources 104 for optimizing one or more target applications 108. For example, the ML-to-ML orchestration service 102 may be provided as a subscription service, in which users of IHS 100 may register for providing ML-to-ML optimization such as described herein.

Figure 4:
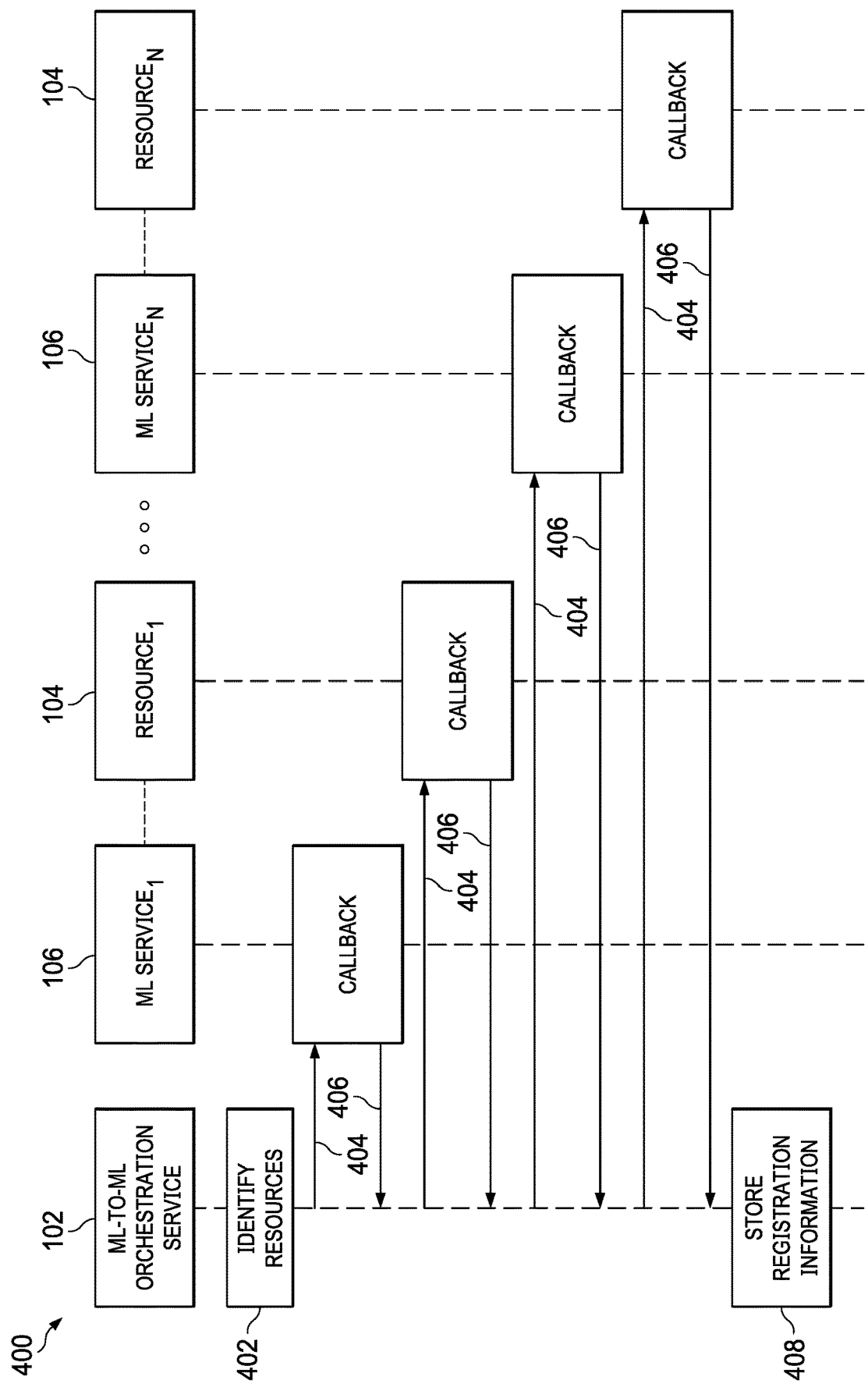
FIG. 4 is a workflow diagram depicting an example registration method that may be performed by the various elements of the system for registering ML-to-ML orchestration service for use with the IHS according to one embodiment of the present disclosure.

FIG. 4 is a workflow diagram depicting an example registration method 400 that may be performed by the various elements of the system 100 for registering ML-to-ML orchestration service 102 for use with the IHS 100 according to one embodiment of the present disclosure. Initially, ML-to-ML orchestration service 102 may be started automatically after OS 302 has been initially started, such as after OS 302 is originally launched (e.g., boot-strapped) by system BIOS 217. In another embodiment, ML-to-ML orchestration service 102 may be started manually, such as in response to user input. In yet another embodiment, if ML-to-ML orchestration service 102 is configured as a cloud service, ML-to-ML orchestration service 102 may be started by receiving a request message from IHS 100 to ML-to-ML orchestration service 102, and sending a response message to IHS 100 for initiating a communication channel between IHS 100 and ML-to-ML orchestration service 102 for enabling control over the resources of IHS 100.

At step 402, ML-to-ML orchestration service 102 identifies the resources and associated ML-based optimization services 106 configured in IHS 100. ML-to-ML orchestration service 102 may identify the resources in any suitable manner. For example, ML-to-ML orchestration service 102 may identify resources configured in IHS 100 by querying BIOS 302 of IHS 100. In many cases, the resources configured in a typical IHS 100 are registered in its BIOS 217. In such cases, EC/BIOS firmware 304 may be accessed to obtain the resource data for those resources registered in its BIOS 110, and stored in a memory 105 of IHS 100. Within this disclosure, resource data generally refers to any information that may be used to access and/or manage its associated resource (e.g., acquire parametric data, change its configuration, etc.) including any ML-based optimization service 106 present in IHS 100 that may be associated with each resource. For any non-registered (unsupported/unqualified) resource, however, its resource data may be unknown. That is, no data or insufficient data for that resource may be available in BIOS 110. In such a case, ML-to-ML orchestration service 102 may perform a discovery process by broadcasting inquiry messages to those resources in IHS 100, and processing ensuing response messages to identify those resources in IHS 100, and storing information about each resource 104 in a memory 105 of IHS 100.

At step 404, ML-to-ML orchestration service 102 a registration request message to each identified resource, along with any ML-based optimization service 106 that is associated with that resource, so that they can be registered for use with ML-to-ML orchestration service 102. In one embodiment, the registration request message includes a callback request, such as an asynchronous callback, issued to an API configured on each resource 104 and its associated ML-based optimization service 106. If the registration request message is directed to a resource 104, the callback request includes executable code for obtaining a type of telemetry data to be obtained by the resource 104 and a frequency at which the specified type of telemetry data is to be sent to the ML-to-ML orchestration service 102. However, if the registration request message is directed to a ML-based optimization service 106, the callback request may include executable code for obtaining a type of ML-based hints to be obtained by the ML-based optimization service 106 and a frequency at which the specified ML-based hints are to be sent to the ML-to-ML orchestration service 102.

Although the workflow diagram 400 is shown transmitting the registration request message directly to the resource 104 and its associated ML-based optimization service 106, it should be appreciated that the registration request message may be transmitted to a device management layer 116 associated with the resource 104 and/or ML-based optimization service 106 such that the device management layer 116 forwards the registration request to its associated resource 104 and/or ML-based optimization service 106.

The device management layer 116 may be useful for verifying one or more policies or one or more compatibility criteria associated with its respective resource 104 and/or ML-based optimization service 106. For example, if ML-to-ML orchestration service 102 issues (e.g., transmits) a registration request message to a particular service 106 in which the registration request message includes an instruction to obtain a type of telemetry data that is non-existent on resource 104 or is not allowed be sent according to certain policy rules, the device management layer 116 may reject the registration request message and respond by issuing a registration request failure message to the ML-to-ML orchestration service 102 indicating that such registration request message has been rejected by the resource 104. Should ML-to-ML orchestration service 102 receive such a registration request failure message, it can then take appropriate actions to handle the failed registration request.

After each resource 104 and its associated ML-based optimization service 106 has processed the registration request message, it responds with a registration request response message at step 406.

At step 408, ML-to-ML orchestration service 102 stores registration information about each resource 104 and associated ML-based optimization service 106 in memory, such as system memory 105, that can be used to retrieve and process ongoing telemetry data obtained about each resource 104 and/or ML-based hints obtained from each ML-based optimization service 106. At this point, ML-to-ML orchestration service 102 has been registered for use with IHS 100 in which the registration method 400 ends.

FIG. 5 is a workflow diagram of an example application optimization method 500 that may be performed by the various elements of system 100 for performing a ML-based learning and optimization procedure according to one embodiment of the present disclosure. Initially, ML-to-ML orchestration service 102 has performed the registration method 400 as described above with reference to FIG. 4. Additionally, ML-to-ML orchestration service 102 has already been started (e.g., launched) and is prepared to provide system wide optimization for a target application 108 when it is started. At step 502, ML-to-ML orchestration service 102 receives an indication that target application 108 has been started on IHS 100.

Thereafter at step 504, ML-to-ML orchestration service 102 determines that target application 108 is one selected for coordinated optimization by ML-to-ML orchestration service 102 and other ML-based optimization services 106 configured in IHS 100. While numerous applications may be used on IHS 100, it may be beneficial to select a certain subset of those applications to for coordinated optimization by ML-to-ML orchestration service 102. In one embodiment, ML-to-ML orchestration service 102 may access a user-editable list, such as one included in a configuration file, of multiple target applications whose performance is slated to be optimized by ML-to-ML orchestration service 102. In another embodiment, ML-to-ML orchestration service 102, or other process included in system 100, may include executable code for providing a ML process to derive which applications are slated to be optimized by ML-to-ML orchestration service 102.

At step 506, ML-to-ML orchestration service 102 accesses its memory to determine if a previous learning procedure has been performed, and if so, obtains ML-based hints from its memory so that they can be combined with those obtained in steps 508-510 described herein below. That is, if a previous learning procedure as described herein has been previously performed, ML-to-ML orchestration service 102 may obtain the stored results of that previously performed learning procedure so that those results may be used in conjunction with results obtained at steps 508-510 to further enhance coordinated optimization that may be performed by ML-to-ML orchestration service 102 and other ML-based optimization services 106 executed on IHS 100.

At step 508, ML-to-ML orchestration service 102 issues a query message to each identified resource, along with any ML-based optimization service 106 that is associated with that resource, for obtaining ML-based hints and/or raw telemetry data from each resource 104 or ML-based optimization service 106. After each resource 104 and its associated ML-based optimization service 106 has processed the query message, it responds by sending telemetry data and/or ML-based hints to ML-to-ML orchestration service 102 at steps 510.

Although the example application learning and optimization method 500 describes a query message that is sent to each resource 104 and ML-based optimization service 106 each time telemetry data or ML-based hints are requested, it should be appreciated that the query message may be sent to only the resource 104 or the ML-based optimization service 106. Additionally, although only resources 104 are their associated ML-based optimization services 106 are shown, it should be understood that ML-to-ML orchestration service 102 may also acquire telemetry information from other resources that do not possess any corresponding ML-based optimization service, such as by acquiring telemetry data from sensors (e.g., 212, 215, 221, etc.) configured in IHS 100. Also, although the example application learning and optimization method 500 describes a query message that is sent to each resource 104 and ML-based optimization service 106 each time telemetry data or ML-based hints are requested, it should be appreciated that each resource 104 and/or ML-based optimization service 106 may be configured to automatically send telemetry data or ML-based hints at ongoing intervals, so that the need to send query messages by ML-to-ML orchestration service 102 each time telemetry data and/or ML-based hints are sent may be obviated in certain embodiments. For example, the callback request messages sent to resources 104 and ML-based optimization services 106 described at step 404 above may include executable code for obtaining a type of telemetry data to be obtained by the resource 104 and a frequency at which the specified type of telemetry data is to be sent to the ML-to-ML orchestration service 102. Thus, when resources 104 and/or ML-based optimization services 106 are operating, they may execute the callback code and autonomously transmit their telemetry data and ML-based hints without specifically being requested.

At step 512, ML-to-ML orchestration service 102 processes the received telemetry data to obtain classification data. For example, ML-to-ML orchestration service 102 may use a classifier, such as a Bayes probabilistic classifier (e.g., probabilistic directed acyclic graphical model) to continually update its derived information based on each new element of telemetry data is received from the resources 104 or ML-based optimization services 106. Thereafter at step 514, ML-to-ML orchestration service 102 may perform a suitable regression technique to derive one or more resource performance features from the classification data.

ML-to-ML orchestration service 102 may then perform an analytics process to generate one or more profile recommendations for optimizing performance of target application 108 on IHS 100 at step 516. That is, ML-to-ML orchestration service 102 may perform the analytics process to identify meaningful patterns about how the resources 104 are operating when executing the target application 108. For example, the analytics process may identify a relatively high occurrence of resource loading events when certain actions are performed by the target application 108. As another example, the analytics process may identify certain other applications that compete for resource usage with the target application 108 under certain operating conditions. The analytics uses identified patterns, such as those described above, to determine one or more profile recommendations (e.g., hints) that can be used to optimize performance of target application 108 on IHS 100.

According to embodiments of the present disclosure, ML-to-ML orchestration service 102 may obtain ML-based hints (e.g., raw telemetry data, classification data, resource performance features, and/or profile recommendations) from ML-based optimization services 106 to augment the complementary classification data, resource performance features, and/or profile recommendations that ML-to-ML orchestration service 102 generates. That is, ML-to-ML orchestration service 102 generates augmented hints by performing either of steps 512, 514, and/or 516 using hints obtained from the resource ML-based optimization services 106 using a ML-to-ML hinting technique, and transmits those augmented hints to certain ML-based optimization services 106 so that the ML-based optimization services 106 can further augment profile recommendations for optimizing performance of the target application 108.

The ML-to-ML hinting technique generally refers to a process of ML whereby features derived by a first ML process may be shared with another ML process to derive additional features above and beyond those features that would otherwise be individually derived. In the present case, ML-to-ML orchestration service 102 combines the ML-based hints generated by resources to generate augmented hints that consider activities of most or all resources used to execute target application 108. Thus, the augmented hints may be used to adjust one or more settings of certain resources 104 to optimize a performance of the target application executed by the resource.

In one embodiment, ML-to-ML orchestration service 102 may perform steps 512, 514, and/or 516 according to a specified priority. For example, in some cases, sharing of ML-based hints between ML-to-ML orchestration service 102 and ML-based optimization service 106 and resources 104 may be abnormally large such that it may be beneficial to limit or throttle the quantity of messages that are transferred. Therefore, each ML-based hint may be included with a priority field identifying a priority for that particular type of message so that, when abnormally large amounts of messages are incurred, ML-to-ML orchestration service 102 may process incoming ML-based hints based upon their priority so that ML-based hints having a relatively high level of importance can be successfully processed with a high level of reliability.

The steps of 512, 514, and 516 may be continually performed throughout a learning window or frame to obtain and process ML-based hints from the resources 104 along with their associated ML-based optimization services 106 for generating the augmented ML-based hints. Nevertheless, it is important that a sufficient amount of telemetry data be obtained so that a relatively complete statistical distribution (e.g., histogram) of data is obtained. Therefore in one embodiment, ML-to-ML orchestration service 102 may continually monitor incoming telemetry data and ML-based hints to estimate the statistical distribution provided by the incoming telemetry data and ML-based hints, and reject or discard the incoming data if an insufficient amount is received. ML-to-ML orchestration service 102 may estimate the statistical distribution in any suitable manner, such as by setting a minimum elapsed period of time for collecting data, a minimum amount of data to be received, calculating a statistical distribution of the collected data to ensure that it possess an adequate structure, and the like.

Steps 518-524 described below generally refer to an optimization phase of the application optimization method 500. Whereas steps 502-516 can be generally referred to as a learning phase in which telemetry data along with ML-based hints are collected and processed without any significant adjustment to the resources 104 of IHS 100, the optimization phase involves adjusting the settings based upon augmented ML-based hints shared between ML-to-ML orchestration service 102 and the participating ML-based optimization services 106 in IHS 100.

At step 518, ML-to-ML orchestration service 102 transmits ML-based hints to participating ML resources 104. Each ML resource 104, in turn, may combine the augmented hints along with hints generated according to its native processes to generate augmented profile recommendations at step 520. Thereafter at step 522, each ML-based optimization service 106 communicates with its respective resource 104 to adjust one or more of its settings. Additionally, at step 524, ML-to-ML orchestration service 102 may communicate directly with one or more of the resources 104 to adjust their settings for optimizing performance of the target application 108.

In some embodiments, ML-to-ML orchestration service 102 may either communicate only with certain ML-based optimization services 106 of each resource 104 to facilitate optimization of target application 108, communicate only with certain resources 104 directly to adjust their operation, and/or communicate with both ML-based optimization service 106 and its associated resource 104 for adjusting one or more settings of that resource 104. For example, ML-to-ML orchestration service 102 may communicate only with a certain resource 104 directly to adjust its settings for several reasons including, lack of any existing ML-based optimization service for that specific resource 104. As another example, ML-to-ML orchestration service 102 may communicate with both ML-based optimization service 106 along with its associated resource 104 because ML-to-ML orchestration service 102 may be provided with a means to adjust certain settings that may not be provided directly from its respective ML-based optimization service 106. As yet another example, ML-to-ML orchestration service 102 may communicate only with the ML-based optimization services 106 associated with each resource 104 to alleviate contention that could potentially otherwise arise if both ML-to-ML orchestration service 102 and ML resource 104 were to each attempt to adjust the same resource setting.

The steps of the aforedescribed process may be repeatedly performed for continual runtime optimization of target application 108 on IHS 100. In some cases, windows or frames of data collection may be arranged in different epochs or time periods in which each epoch comprises a particular mode of operation of the target application 108. For example, a first epoch may involve a mode of operation of a graphics-intensive application that is predominantly using graphics-related resources (e.g., GPU resources), such as when a user is constructing or manipulating a graphic image. During a second epoch, however, the graphics-intensive application is predominantly using storage-related resources due to the fact that the user is accessing memory for storing the graphics image that was previously constructed using the graphics-intensive application. Thus, ML-to-ML orchestration service 102 may be configured to adjust the window or frame of data collection and processing to be at least partially concurrent with a mode of operation or epoch in which the target application 108 is being operated in according to certain embodiments.

The steps of the application optimization method 500 may be repeated for continual optimization of the target application 108 on IHS 100. Nevertheless, when use of the method 500 is no longer needed or desired, the method ends.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) orchestration system, comprising:
at least one processor; and
at least one memory coupled to the at least one processor, the at least one memory having program instructions stored thereon that, upon execution by the at least one processor, cause the IHS to:
for each of a plurality of resources used to execute a target application on the IHS, receive one or more machine learning (ML)-based hints associated with the resource that have been generated by a one of a plurality of ML-based optimization services associated with the resource;
generate, using the ML-based hints received from each of the ML-based optimization services, one or more augmented hints for at least one of the plurality of resources using a ML-to-ML orchestration service; and
transmit the augmented hints to at least one of the ML-based optimization services associated with the at least one resource,
wherein the at least one ML-based optimization service combines the ML-based hints with the one or more augmented hints generated by the at least one ML-based optimization service to generate one or more augmented profile recommendations, and
wherein the at least one ML-based optimization service uses the augmented profile recommendations to adjust one or more settings of the at least one resource to optimize a performance of the target application.

2. The IHS orchestration system of claim 1, wherein at least one of the plurality of resources comprises at least one of a hardware resource, a software resource, or a platform resource of the IHS.

3. The IHS orchestration system of claim 1, wherein each of the ML-based hints comprises at least one of a profile recommendation, a resource performance feature, classification information, and raw telemetry data.

4. The IHS orchestration system of claim 1, wherein the ML-to-ML orchestration service is provided as a cloud-based service.

5. The IHS orchestration system of claim 1, wherein the instructions are further executed to perform a discovery operation to identify the resources of the IHS.

6. The IHS orchestration system of claim 1, wherein each of the plurality of resources comprises a device management layer having an application program interface (API) for communicating with the instructions via a secure login session with administrative rights.

7. The IHS orchestration system of claim 6, wherein the instructions are further executed to perform a registration operation during an initial secure login session with the device management layer, the instructions being further executed to perform the registration operation by at least one of verifying one or more policies or one or more compatibility criteria associated with the resource.

8. The IHS orchestration system of claim 6, wherein the instructions are further executed to perform the registration operation by transmitting a type of parametric data to be obtained by the device management layer and a frequency at which the type of parametric data is to be sent to the instructions.

9. The IHS orchestration system of claim 1, wherein the at least one resource is void of any ML-based optimization service, the instructions are further executed to receive telemetry data associated with operation of the resource, and determine the profile recommendations for the at least one resource using the telemetry data.

10. The IHS orchestration system of claim 1, wherein the instructions are further executed to generate the one or more augmented hints according to a priority level indicator associated with each of the ML-based hints.

11. An Information Handling System (IHS) orchestration method, comprising:
for each of a plurality of resources used to execute a target application on the IHS, receiving one or more machine learning (ML)-based hints associated with the resource that have been generated by a one of a plurality of ML-based optimization services associated with the resource;
generating, using the ML-based hints received from each of the ML-based optimization services, one or more augmented hints for at least one of the plurality of resources using a ML-to-ML orchestration service; and
transmitting the augmented hints to at least one of the ML-based optimization services associated with the at least one resource,
wherein the at least one ML-based optimization service combines the ML-based hints with the one or more augmented hints generated by the at least one ML-based optimization service to generate one or more augmented profile recommendations, and
wherein the at least one ML-based optimization service uses the augmented profile recommendations to adjust one or more settings of the at least one resource to optimize a performance of the target application.

12. The IHS orchestration method of claim 11, wherein at least one of the plurality of resources comprises at least one of a hardware resource, a software resource, or a platform resource of the IHS.

13. The IHS orchestration method of claim 11, wherein the ML-to-ML orchestration service is provided as a cloud-based service.

14. The IHS orchestration method of claim 11, further comprising performing a discovery operation to identify the resources of the IHS.

15. The IHS orchestration method of claim 11, wherein each of the plurality of resources comprises a device management layer having an application program interface (API) for communicating with the instructions via a secure login session with administrative rights.

16. The IHS orchestration method of claim 15, further comprising performing a registration operation during an initial secure login session with the device management layer, the instructions being further executed to perform the registration operation by at least one of verifying one or more policies or one or more compatibility criteria associated with the resource.

17. The IHS orchestration method of claim 15, further comprising performing the registration operation by transmitting a type of parametric data to be obtained by the device management layer and a frequency at which the type of parametric data is to be sent to the instructions.

18. The IHS orchestration method of claim 11, wherein the resource is void of any ML-based optimization service, the method further comprising receiving telemetry data associated with operation of the resource, and determining the profile recommendations for the at least one resource using the telemetry data.

19. The IHS orchestration method of claim 11, further comprising generating the one or more augmented hints according to a priority level indicator associated with each of the ML-based hints.

20. A memory storage device having program instructions stored thereon that, upon execution by one or more processors of an Information Handling System (IHS), cause the IHS to:
  for each of a plurality of resources used to execute a target application on the IHS, receive one or more machine learning (ML)-based hints associated with the resource that have been generated by a one of a plurality of ML-based optimization services associated with the resource;
  generate, using the ML-based hints received from each of the ML-based optimization services, one or more augmented hints for at least one of the plurality of resources using a ML-to-ML orchestration service; and
  transmit the augmented hints to at least one of the ML-based optimization services associated with the at least one resource,
  wherein the at least one ML-based optimization service combines the ML-based hints with the one or more augmented hints generated by the at least one ML-based optimization service to generate one or more augmented profile recommendations, and
  wherein the at least one ML-based optimization service uses the augmented profile recommendations to adjust one or more settings of the at least one resource to optimize a performance of the target application.

* * * * *